(12) United States Patent
Su et al.

(10) Patent No.: US 8,610,872 B2
(45) Date of Patent: Dec. 17, 2013

(54) LIQUID CRYSTAL ALIGNMENT PROCESS

(75) Inventors: Chun-wei Su, Taipei (TW); Jan-tien Lien, Keelung (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 302 days.

(21) Appl. No.: 13/011,859

(22) Filed: Jan. 21, 2011

(65) Prior Publication Data

US 2012/0081652 A1 Apr. 5, 2012

(30) Foreign Application Priority Data

Oct. 4, 2010 (TW) ................................ 99133755 A

(51) Int. Cl.
G02F 1/13 (2006.01)

(52) U.S. Cl.
USPC .......................................... 349/191; 349/187

(58) Field of Classification Search
USPC .................................................. 349/191, 187
See application file for complete search history.

(56) References Cited

U.S. PATENT DOCUMENTS

| | | | | |
|---|---|---|---|---|
| 5,373,380 | A * | 12/1994 | Harada et al. | 349/172 |
| 6,480,250 | B1 * | 11/2002 | Matsufuji et al. | 349/113 |
| 6,903,787 | B2 * | 6/2005 | Kishida et al. | 349/92 |
| 2003/0067579 | A1 * | 4/2003 | Inoue et al. | 349/187 |
| 2004/0095536 | A1 * | 5/2004 | Yoshida et al. | 349/117 |
| 2005/0030458 | A1 * | 2/2005 | Sasabayashi et al. | 349/129 |
| 2005/0185131 | A1 * | 8/2005 | Miyachi et al. | 349/167 |
| 2005/0264730 | A1 * | 12/2005 | Kataoka et al. | 349/114 |
| 2005/0266177 | A1 * | 12/2005 | Sawatari et al. | 428/1.2 |
| 2006/0087605 | A1 * | 4/2006 | Sasabayashi et al. | 349/127 |
| 2006/0109406 | A1 * | 5/2006 | Sasabayashi et al. | 349/129 |
| 2006/0125970 | A1 * | 6/2006 | Inoue et al. | 349/38 |
| 2008/0123038 | A1 * | 5/2008 | Suwa et al. | 349/129 |
| 2009/0051854 | A1 * | 2/2009 | Okabe et al. | 349/86 |
| 2010/0066959 | A1 * | 3/2010 | Hsu et al. | 349/123 |
| 2010/0265442 | A1 * | 10/2010 | Sasabayashi et al. | 349/129 |
| 2011/0075060 | A1 * | 3/2011 | Sasabayashi et al. | 349/38 |
| 2011/0080551 | A1 * | 4/2011 | Hsieh et al. | 349/182 |
| 2012/0154701 | A1 * | 6/2012 | Sasabayashi et al. | 349/42 |

FOREIGN PATENT DOCUMENTS

| | | |
|---|---|---|
| TW | 200944901 | 11/2009 |
| TW | 200949385 | 12/2009 |
| TW | I325081 | 5/2010 |

* cited by examiner

Primary Examiner — Kaveh Kianni
(74) Attorney, Agent, or Firm — Cheng-Ju Chiang

(57) ABSTRACT

A liquid crystal alignment process comprises steps of: providing a first substrate and a second substrate to form a liquid crystal accommodating space therebetween; pouring a liquid crystal composition into the liquid crystal accommodating space, the liquid crystal composition comprising liquid crystal molecules, a first monomer material, and a second monomer material; applying a voltage difference to the first and second substrates for arranging the liquid crystal molecules at a pre-tilt angle; and exposing the liquid crystal composition by mixed multi-spectrum rays for polymerizing the first monomer material and the second monomer material to form at least one type of liquid crystal alignment polymer on opposite surfaces of the first and second substrates. The liquid crystal alignment process is capable of improving the efficiency of exposure procedure, reducing time to manufacture products, and is capable of solving the problems of high costs and waste pollution.

11 Claims, 5 Drawing Sheets

LIQUID CRYSTAL ALIGNMENT PROCESS

TECHNICAL FIELD OF THE INVENTION

The present invention relates to a process for a liquid crystal panel, and more particularly, to a liquid crystal alignment process.

BACKGROUND OF THE INVENTION

Controlling the alignment of liquid crystal molecules is one of the most important technologies of manufacturing a liquid crystal display. The image quality of the liquid crystal display is related to the alignment of liquid crystal molecules. High-quality images can be presented only when the liquid crystal molecules are aligned steadily and uniformly in the display panel. A thin layer which is utilized for directionally arranging the liquid crystal molecules is generally called a liquid crystal alignment layer.

According to different applications and principles, liquid crystal alignment technologies can be classified into a multi-domain vertical alignment (MVA) technology and a polymer sustained alignment (PSA) technology, for example.

Taiwan Patent No. I325081 discloses a display panel utilizing the MVA technology. Please refer to FIGS. 1A and 1B. FIG. 1A is a diagram showing a pixel disposed in a traditional liquid crystal display panel utilizing the MVA technology. FIG. 1B is a sectional view of the pixel shown in FIG. 1A. As shown in FIG. 1B, the traditional MVA liquid crystal display panel includes a first substrate 12, a second substrate 14 parallel to the first substrate 12, and liquid crystal molecules 15 disposed between the first substrate 12 and the second substrate 14. As shown in FIG. 1A, the first substrate 12 has pixel areas 100 which are defined by scan lines 122 and 122', and data lines 124 and 124'. Each pixel area 100 includes a storage capacitor bus line 126 which is parallel to the scan lines 122 and 122', and the storage capacitor bus line 126 is set across the pixel area 100.

As shown in FIGS. 1A and 1B, the traditional MVA liquid crystal display panel utilizes bumps 125 which are disposed in the pixel 100 for aligning the liquid crystal molecules 15. The bumps 125 are arranged in different regions and the respective planes of the bumps are inclined so that the liquid crystal molecules 15 are tilted along different directions, and therefore the pixels 100 can form multiple display regions so as to accomplish a feature of wide viewing angle. However, in the traditional MVA technology, the display aperture ratio is affected by the bumps 125, resulting in decrease of the penetration rate. Moreover, the traditional MVA technology has drawbacks of dark fringes in a bright state and light leakage in a dark state, leading to degradation of the image quality.

U.S. Pat. No. 6,903,787 discloses a display panel utilizing the PSA technology. Please refer to FIGS. 2A to 2C, which are diagrams showing a flow scheme of a conventional PSA process for aligning the liquid crystal molecules with a liquid crystal alignment polymer. As shown in FIG. 2A, two parallel substrates, i.e. a first substrate 22 and a second substrate 24, are provided. A first conductive layer 221 and a second conductive layer 241 are respectively disposed on opposite surfaces of the first and second substrates 22 and 24. The first and second conductive layers 221 and 241 are coated respectively with polyimide (PI) alignment films 223 and 243, in advance. Each polyimide molecule has an imide radical which makes the main chain possessing remarkable rigidity and strong molecular interaction so that the PI alignment films 223 and 243 are able to be utilized for auxiliary alignment. Next, liquid crystal molecules 252 and a monomer material 254 are poured into a liquid crystal accommodating space 25 which is confined by the first and second substrates 22 and 24, and more specifically, located between the two PI alignment layers 223 and 243. As shown in FIG. 2B, a voltage source 261 is connected to the first conductive layer 221 on the first substrate 22 and the second conductive layer 241 on the second substrate 24. The voltage source 261 applies a voltage difference to the first and second conductive layers 221 and 241. The voltage difference makes the liquid crystal molecules 252 twisting at a pre-tilt angel. Moreover, an exposure procedure is performed with an ultraviolet light (UV) 262 to polymerize the monomer material 254. As shown in FIG. 2C, after the monomer material 254 is polymerized, polymer alignment layers 228 and 248 are respectively formed on the first substrate 22 and the second substrate 24. The polymer alignment layers 228 and 248 have a function of aligning the liquid crystal molecules 252.

In addition, Taiwan Patent Publication No. 200944901 discloses an alignment technology utilizing one monomer material to form a polymer for aligning the liquid crystal molecules. In this prior art, two procedures are adopted to expose the monomer material. In order to avoid destroying the liquid crystal molecules, rays of which wavelengths are longer than 290 nm are selected in a first exposure procedure for polymerizing a part of the monomer material to form two polymer steady alignment layers. Rays of which wavelengths lie between 290 nm and 340 nm are selected in a second exposure procedure for polymerizing the remaining monomer material. The '901 TW published patent is capable of solving the problem of poor performance of image sticking test for the liquid crystal display panel caused by a great residual amount of the monomer material.

Compared to the MVA technology, the PSA technology can make the liquid crystal molecules aligned much steadily. Also, bump structures are not required in the PSA technology, and therefore the problems of dark fringes in a bright state and light leakage in a dark state do not exist. Therefore, the PSA technology is capable of increasing the penetration rate for the display panel and decreasing brightness for the dark state.

However, the liquid crystal alignment process disclosed by the '787 US patent needs to coat the PI alignment films in advance. A PI coating generally at least requires equipments such as a coating machine, a baking machine, a heating plate, and a cooling plate. The PI coating results in requirement of expensive equipments so that the manufacturing cost is hard to be cut down and reduced. Moreover, the PI coating needs to use a PI cleaner, and high-temperature gas exhausted from the process will cause a great harm to the environment. Furthermore, the liquid crystal alignment process disclosed by the '901 TW published patent adopts two exposure procedures to polymerize the monomer material, in which two UV tubes of different spectrums, together with filters, are respectively used in the two procedures. Therefore, the time for manufacturing products is lengthened and the whole manufacturing cost will be increased.

Therefore, how to solve the problems of high costs and waste pollution caused by coating the PI alignment films in advance in the conventional PSA technology, and how to decrease the manufacturing cost due to exposing the monomer material by multiple procedures are important issues in this technical field.

SUMMARY OF THE INVENTION

An objective of the present invention is to provide a liquid crystal alignment process for improving the efficiency of exposure procedure and reducing time to manufacture products.

Another objective of the present invention is to provide a liquid crystal alignment process for solving the problems of high costs and waste pollution caused by manufacturing liquid crystal alignment layers.

According to the above objective, the present invention provides a liquid crystal alignment process comprising steps of: providing a first substrate and a second substrate to form a liquid crystal accommodating space therebetween; pouring a liquid crystal composition into the liquid crystal accommodating space, the liquid crystal composition comprising liquid crystal molecules, a first monomer material, and a second monomer material; applying a voltage difference to the first and second substrates for arranging the liquid crystal molecules at a pre-tilt angle; and exposing the liquid crystal composition by mixed multi-spectrum rays for polymerizing the first monomer material and the second monomer material to form at least one type of liquid crystal alignment polymer on opposite surfaces of the first and second substrates.

In another aspect, the present invention provides a liquid crystal alignment process comprising steps of: providing a first substrate and a second substrate to form a liquid crystal accommodating space therebetween; pouring a liquid crystal composition into the liquid crystal accommodating space, the liquid crystal composition comprising liquid crystal molecules, a first monomer material, a second monomer material, and a polymerization initiator; applying a voltage difference to the first and second substrates for arranging the liquid crystal molecules at a pre-tilt angle; and exposing the liquid crystal composition by mixed multi-spectrum rays for polymerizing the first monomer material and the second monomer material, and the second monomer material being polymerized to form a second polymer alignment layer on at least one opposite surface of the first and second substrates as well as the first monomer material being polymerized to form a first polymer alignment layer on a surface of the second polymer alignment layer.

Compared to expose monomer materials by single-spectrum rays, the present invention does not need to substitute ultraviolet (UV) tubes and filters of different spectrums, and therefore is able to improve the efficiency of exposure procedure and reduce time to manufacture products since the mixed multi-spectrum rays are utilized to perform the exposure procedure for polymerizing the first monomer material and the second monomer material to form the first polymer alignment layer and the second polymer alignment layer. Moreover, the polymer alignment layers formed according to the present invention can maintain the quality of aligning the liquid crystal molecules. The liquid crystal molecules are aligned steadily and securely.

The present invention utilizes monomer materials to be polymerized to form structures for aligning the liquid crystal molecules instead of coating a PI alignment film. The expensive equipments generally used in the PI coating procedure are not required in the present invention. Therefore, the present invention can simplify the manufacturing process and speed up the production, and therefore is able to reduce the manufacturing cost. Also, the preset invention does not need to use organic solvents to clean APR plates, and therefore complies with energy saving and carbon reduction which are emphasized in modern life. In addition, the present invention does not need to dispose bump structures in the pixel areas of the display panel to align the liquid crystal molecules, and therefore is capable of achieving the optical properties such as high brightness and high contrast (without light leakage in a dark state) for the display panel.

BRIEF DESCRIPTION OF THE DRAWINGS

FIG. 2A is a diagram showing a step of providing liquid crystal molecules and a monomer material in a liquid crystal accommodating space.

FIG. 2B is a diagram showing a step of applying a voltage difference to two substrates and a step of performing an exposure procedure.

FIG. 2C is a diagram showing a step of polymerizing the monomer material to form a polymer alignment layer for aligning the liquid crystal molecules.

FIG. 3A is a diagram showing a step of providing liquid crystal molecules, a first monomer material, and a second monomer material in a liquid crystal accommodating space.

FIG. 3B is a diagram showing a step of applying a voltage difference to two substrates and a step of performing an exposure procedure.

FIG. 3C is a diagram showing a step of polymerizing the second monomer material to form a second polymer alignment layer.

FIG. 3D is a diagram showing a step of polymerizing the first monomer material to form a first polymer alignment layer on a surface of the second polymer alignment layer, the first polymer alignment layer being utilized for aligning the liquid crystal molecules.

DETAILED DESCRIPTION OF THE INVENTION

Figure 1A:
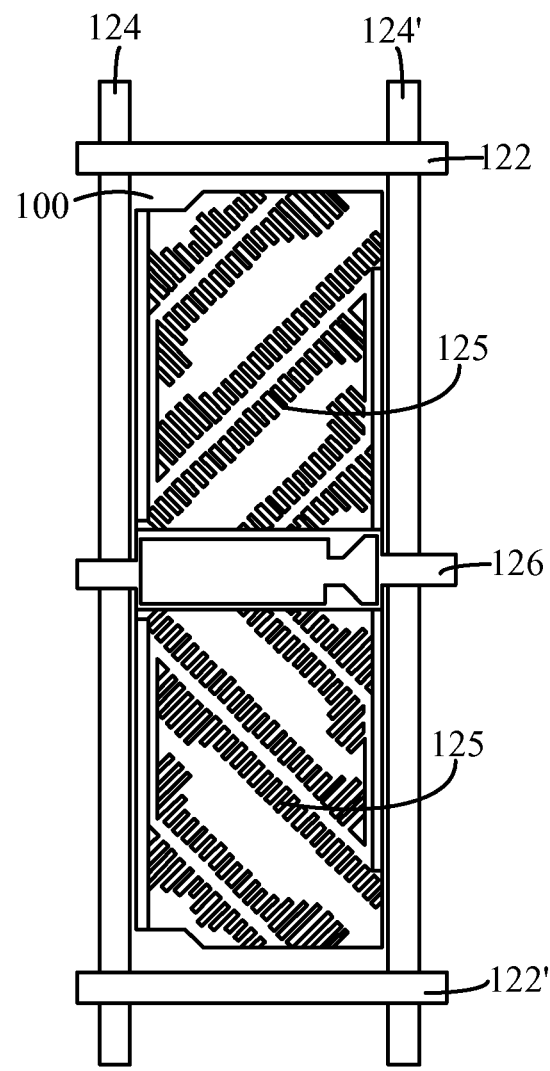
FIG. 1A is a diagram showing a pixel disposed in a traditional liquid crystal display panel utilizing a multi-domain vertical alignment (MVA) technology.
Figure 1B:
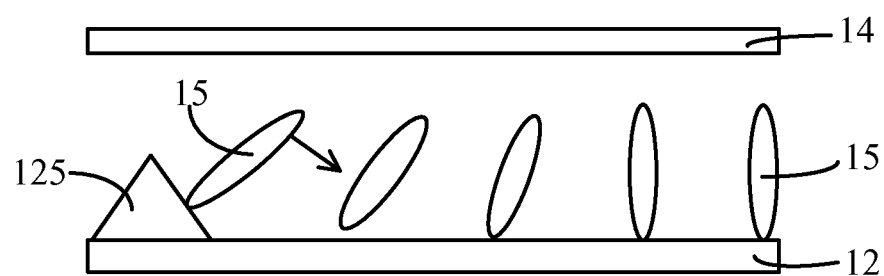
FIG. 1B is a sectional view of the pixel shown in FIG. 1A.
Figure 2A:
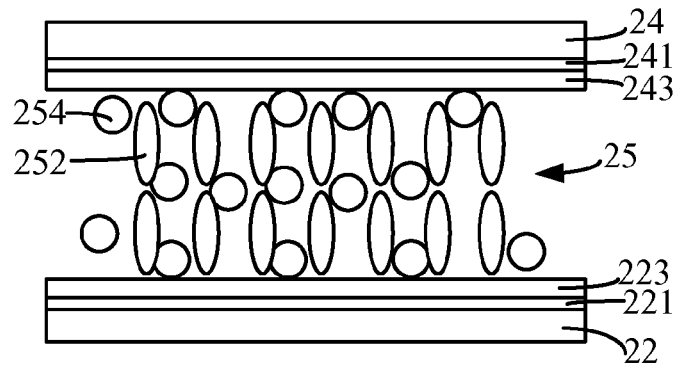
FIGS. 2A to 2C are diagrams showing a flow scheme of a conventional polymer sustained alignment (PSA) process.
Figure 2B:
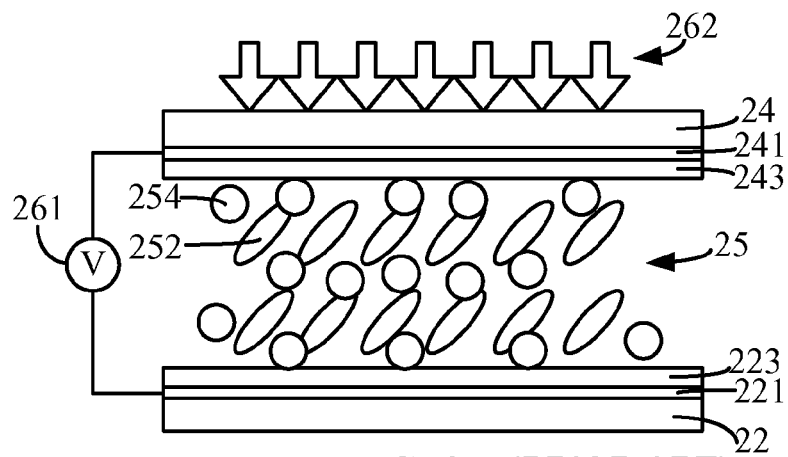
Figure 2C:
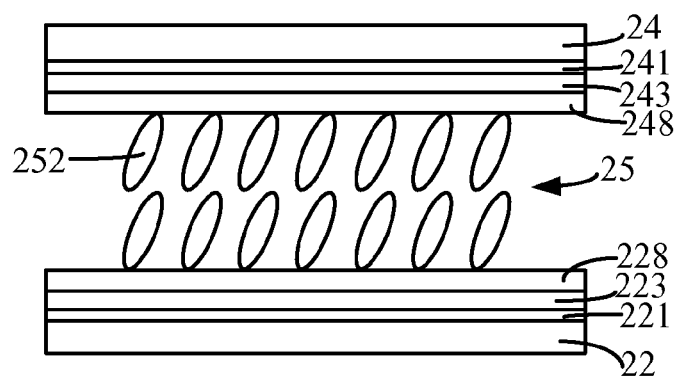
Figure 3A:
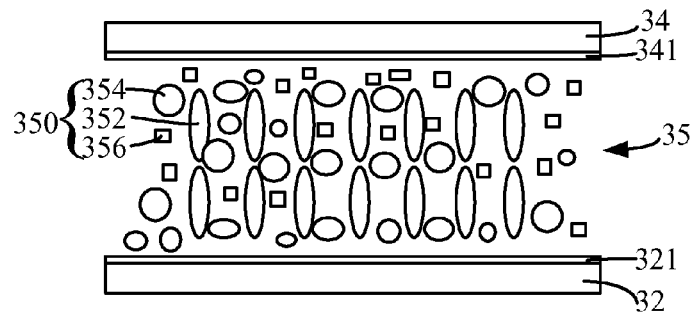
FIGS. 3A to 3D are diagrams showing a flow scheme of a liquid crystal alignment process implemented according to the present invention.

Please refer to FIGS. 3A to 3D which are diagrams showing a flow scheme of a liquid crystal alignment process implemented according to the present invention. As shown in FIG. 3A, a first substrate 32 and a second substrate 34 parallel to the first substrate 32 are provided. The first substrate 32 can be a thin-film transistor (TFT) array substrate. The second substrate 34 can be a substrate opposite to the TFT array substrate, or specifically, a color filter substrate (CF substrate). A first conductive layer 321 and a second conductive layer 341 are respectively disposed on the opposite surfaces of the first substrate 32 and the second substrate 34. The conductive layers 321 and 341 can be transparent indium tin oxide (ITO) films. A liquid crystal accommodating space 35 is formed between the first and second substrates 32 and 34, and more specifically, is formed between the first and second conductive layers 321 and 341.

As shown in FIG. 3A, a liquid crystal composition 350 is poured into the liquid crystal accommodating space 35. The liquid crystal composition 350 includes liquid crystal molecules 352, a first monomer material (A) 354, and a second monomer material (B) 356. The liquid crystal composition 350 may also include a polymerization initiator (not shown). That is, the polymerization initiator may also be poured into the liquid crystal accommodating space 35 together with the monomer materials 354 and 356, and the liquid crystal molecules 352. The polymerization initiator is capable of accelerating polymerizing reactions of the first monomer material (A) 354 and the second monomer material (B) 356.

Figure 3B:
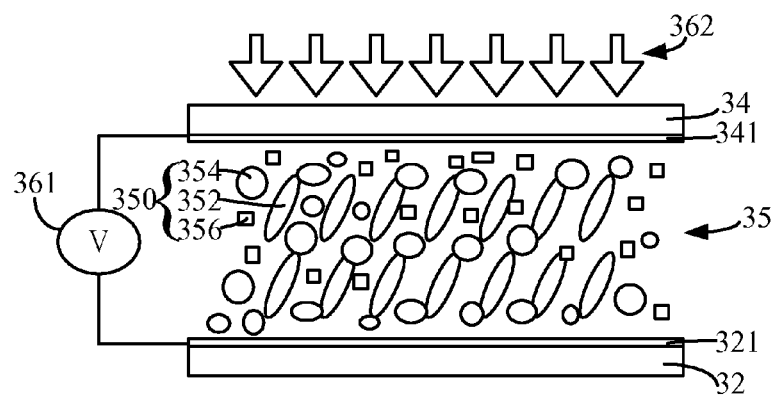

As shown in FIG. 3B, a voltage source 361 is connected to the first conductive layer 321 and the second conductive layer 341 on the substrates 32 and 34. The voltage source 361 can apply a voltage difference to the first conductive layer 321 on the first substrate 32 and the second conductive layer 341 on the second substrate 34 for arranging the liquid crystal molecules 352 at a pre-tilt angle. The voltage difference makes the liquid crystal molecules 352 twisting at the pre-tilt angel.

As shown in FIG. 3B, mixed multi-spectrum rays 362 are utilized to expose the liquid crystal composition 350 in at least one exposure procedure so as to polymerize the first monomer material (A) 354 and the second monomer material (B) 356. The mixed multi-spectrum rays 362 include rays of at least two spectrums. Said two spectrums may be overlapped, or independent to each other, or their wavelengths are discontinuous. In addition, said rays of two spectrums may be emitted out respectively from two independent light sources. Alternatively, rays of two distinguishable spectrums emitted from one light source can be implemented as well. Specifically, the mixed multi-spectrum rays 362 may include rays of an ultraviolet spectrum. In one embodiment, the first monomer material (A) 354 and the second monomer material (B) 356 are irradiated by the mixed multi-spectrum rays 362 at the same time. That is, the monomer materials 354 and 356 receive rays of at least two distinguishable spectrums at the same time. In addition, the polymerization initiator may also be irradiated by the mixed multi-spectrum rays 362. In one embodiment, the first monomer material (A) 354 and the second monomer material (B) 356 are exposed to be polymerized in one exposure procedure. That is, polymerizing reactions of the monomer materials 354 and 356 are accomplished by only one exposure procedure.

Figure 3C:
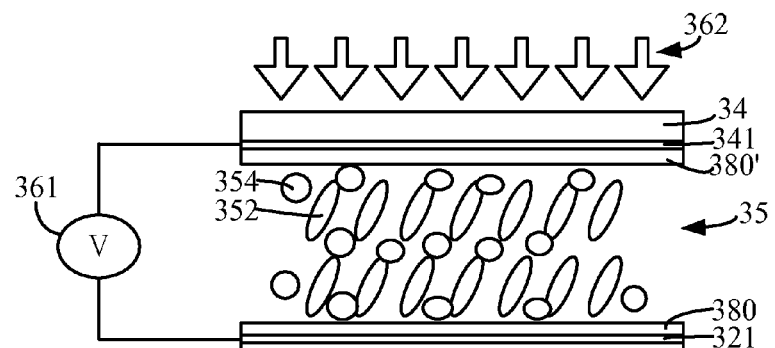
Figure 3D:
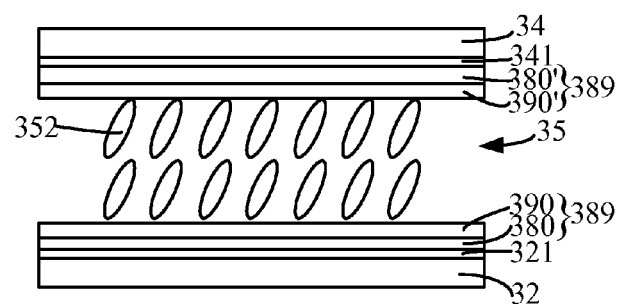

As shown in FIGS. 3C and 3D, after performing the exposure procedure with the mixed multi-spectrum rays 362, the first monomer material (A) 354 and the second monomer material (B) 356 are polymerized to form at least one liquid crystal alignment polymer 389 on opposite surfaces of the first and second substrates 32 and 34. The liquid crystal alignment polymer 389 includes first polymer alignment layers 390 and 390', and second polymer alignment layers 380 and 380'. The liquid crystal alignment polymer 389 has a function of aligning the liquid crystal molecules 352. As shown in FIG. 3C, the second polymer alignment layers 380 and 380', generated by polymerizing the second monomer material (B) 356 is formed on opposite surfaces of the first and second substrates 32 and 34, respectively. As shown in FIG. 3D, the first polymer alignment layers 390 and 390', generated by polymerizing the first monomer material 354 is formed on the surfaces of the second polymer alignment layers 380 and 380', respectively.

Compared to expose monomer materials by single-spectrum rays, the present invention does not need to substitute ultraviolet (UV) tubes and filters of different spectrums, and therefore is able to improve the efficiency of exposure procedure and reduce time to manufacture products since the mixed multi-spectrum rays 362 are utilized to perform the exposure procedure for polymerizing the first monomer material (A) 354 and the second monomer material (B) 356 to form the first polymer alignment layers 390 and 390', and the second polymer alignment layers 380 and 380'. Moreover, the polymer alignment layers formed according to the present invention can maintain the quality of aligning the liquid crystal molecules. The liquid crystal molecules are aligned steadily and securely.

In one embodiment, the first monomer material (A) 354 and the second monomer material (B) 356 are two monomer materials respectively having a hydrophilic structure and a lipophilic structure. In the procedure of exposing by the mixed multi-spectrum rays 362, the second monomer material (B) 356 having the lipophilic structure is polymerized gradually to form the second polymer alignment layers 380 and 380', on the surface layers of the first and second substrates 32 and 34, respectively. The second polymer alignment layers 380 and 380' are steadily adhered to the first and second substrates 32 and 34, respectively, and are interfered with the liquid crystal molecules 352 by the Van Der Waals force for auxiliary alignment. The function of the second polymer alignment layers 380 and 380' is similar to that of traditional PI alignment films. The first monomer material (A) 354 having the hydrophilic structure is polymerized to form the first polymer alignment layers 390 and 390' on the surfaces of the second polymer alignment layers 380 and 380', respectively. The first monomer material (A) 354 has a side chain, and the polymerized first polymer alignment layers 390 and 390' are constituted by a plurality of side chain structures which have a characteristic of joining the second polymer alignment layers 380 and 380', and the liquid crystal molecules 352. Said side chain structures are utilized for confining the liquid crystal molecules 352 to be arranged at the pre-tilt angel.

In another embodiment, the second monomer material (B) 356 is a non-polar monomer material having a lipophilic structure and a long chain. The long chain has a PI group in one end and an interfering group in the other end. That is, the long chain is bifunctional. The first monomer material (A) 354 is a polar monomer material of a short chain having a hydrophilic structure. The first monomer material (A) 354 also has a side chain. In the procedure of exposing by the mixed multi-spectrum rays 362, the PI group of the second monomer material (B) 356 is polymerized gradually to form the second polymer alignment layers 380 and 380', on the surface layers of the first and second substrates 32 and 34, respectively. The second polymer alignment layers 380 and 380' are steadily adhered to the first and second substrates 32 and 34, respectively. The side chain of the first monomer material (A) 354 joins the liquid crystal molecules 352 and the interfering group of the second monomer material (B) 356. The first monomer material (A) 354 is polymerized to form the first polymer alignment layers 390 and 390', on the surfaces of the second polymer alignment layers 380 and 380', respectively. It is noted that the first polymer alignment layers 390 and 390' are not solid layers. The first polymer alignment layers 390 and 390' confine the liquid crystal molecules 352 by a non-contact force, i.e. electromagnetic force, to arrange the liquid crystal molecules 352 at the pre-tilt angel.

In the present invention, the first monomer material (A) 354 and the second monomer material (B) 356 can be implemented respectively as follows:

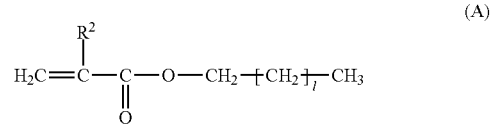

(A)

(B)

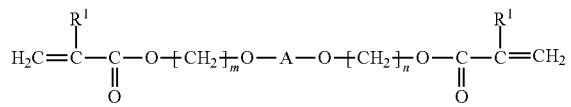

where $R^1$ and $R^2$ can be hydrogen, halogen, methyl group, or cyanic group, m, n, l are integers greater than or equal to 1, and A can be a group such as:

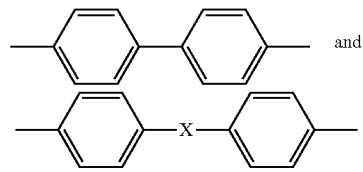

and where X is alkyl group or alkyl halide group in which C≥1. In addition, the polymerization initiator can be implemented as the following structure:

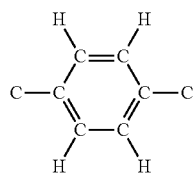

Above all, the first monomer material (A) 354 and the second monomer material (B) 356 are polymerized to respectively form the first polymer alignment layers 390 and 390', and the second polymer alignment layers 380 and 380'. The function of the second polymer alignment layer 380 and 380' is similar to that of traditional PI alignment films formed by coating. The present invention utilizes monomer materials to be polymerized to form structures for aligning the liquid crystal molecules 352 instead of coating a PI alignment film. The expensive equipments generally used in the PI coating procedure are not required in the present invention. Therefore, the present invention can simplify the manufacturing process and speed up the production, and therefore is able to reduce the manufacturing cost. Also, the preset invention does not need to use organic solvents to clean APR plates, and therefore complies with energy saving and carbon reduction emphasized in modern life. In addition, the present invention does not need to dispose bump structures in the pixel areas of the display panel to align the liquid crystal molecules 352, and therefore is capable of achieving the optical properties such as high brightness and high contrast (without light leakage in a dark state) for the display panel.

The absorption wavelengths of the monomer material (A), the monomer material (B), and the polymerization initiator (C1 or C2) are respectively, for instance, 200-220 nm (A), 310-365 nm (B), 254-300 nm (C1), 254-320 nm (C2), as shown in Table 1. Generally, the absorption wavelengths of the liquid crystal molecules are less than 300 nm. When the liquid crystal molecules are irradiated by the UV light of short-spectrum, the original property of the liquid crystal molecules is easily to be destroyed. Traditionally, when irradiating with an UV light, a filter is utilized to filter out the wavelengths less than 300 nm for protecting the liquid crystal molecules from being destroyed.

TABLE 1

| Monomer | UV absorption wavelengths (nm) |
|---------|-------------------------------|
| A | 200-220 |
| B | 310-365 |
| C1 | 254-300 (strong source > 100 mW) |
| C2 | 254-320 (weak source < 20 mW) |

In the procedure of exposing by the mixed multi-spectrum rays, the present invention can determine the exposure time interval and energy for each selected spectrum and then perform the exposure procedure by continuous exposure or intermittent exposure based on the premise that the liquid crystal molecules will not seriously damaged. Rays of which wavelengths are less than 300 nm can be selected for the exposure procedure but the exposure time interval and energy should be limited in order to avoid destroying the liquid crystal molecules. Since the exposure time interval and energy for each spectrum can be altered or adjusted, the aforesaid mixed multi-spectrum rays may have at least two spectrums of which irradiation time spans are different to each other.

In the present invention, the mixed multi-spectrum rays may comprise rays of which spectrum is within a range of absorption wavelengths of the monomer material (A), i.e. 200-220 nm, or comprise rays of which spectrum is within a range of absorption wavelengths of the monomer material (B), i.e. 310-365 nm, or comprise rays of which spectrum is within a range of absorption wavelengths of the polymerization initiator (C1 or C2), i.e. 254-300 nm or 254-320 nm.

As shown in Table 1, the absorption wavelengths of the monomer material (A) (200-220 nm) are very short, and therefore it is necessary to accompany with a high-reactive initiator (e.g. C1 and C2) which absorbs less UV energy. When using the polymerization initiator and radiating with UV rays of 254-300 nm or 254-320 nm, the polymerization initiator will speed up the releasing of electron pairs and therefore accelerate the polymerization reaction of the monomer material (A). Therefore, it can avoid using UV rays of 200-220 nm. A preferred spectrum combination for the mixed multi-spectrum rays may include rays of which spectrum is within a range of absorption wavelengths of the monomer material (A) (200-220 nm) and rays of which spectrum is within a range of absorption wavelengths of the polymerization initiator (254-300 nm or 254-320 nm). In other embodiments, a preferred spectrum combination for the mixed multi-spectrum rays may include rays of which spectrum is within a range of absorption wavelengths of the second monomer material and rays of which spectrum is within a range of absorption wavelengths of the polymerization initiator.

Figure 4A:
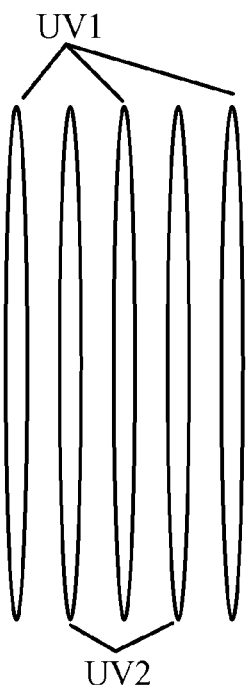
FIG. 4A is a diagram showing a mixed tube device capable of emitting rays of two different UV wavelengths (or spectrums).
Figure 4B:
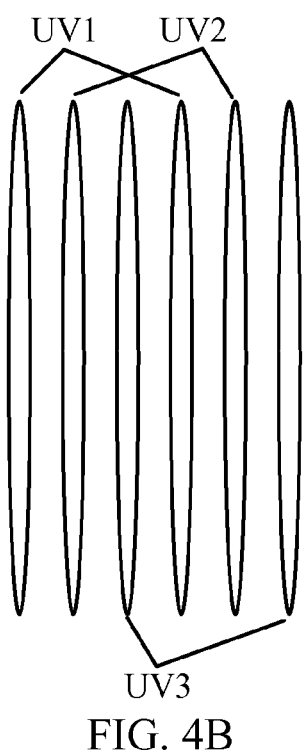
FIG. 4B is a diagram showing a mixed tube device capable of emitting rays of three different UV wavelengths (or spectrums).

The monomer material (A), the monomer material (B), the polymerization initiator (C1 or C2), and the liquid crystal molecules are mixed together. Since the absorption wavelengths of each monomer material are different from each other, it has significant difficulty in UV exposure technology. A multi-spectrum UV light source can be manufactured in the present invention by combing a couple of different UV tubes, and each UV tube emits rays of a single spectrum (or a single wavelength) and low energy (below 60 mw). The two mixed tube devices respectively shown in FIGS. 4A and 4B are capable of emitting rays of two different UV wavelengths (or spectrums) and three different UV wavelengths (or spectrums), respectively. It is convenient to control the polymerization reaction or formation of the monomer materials induced by UV light when utilizing the mixed tube devices.

Said devices also can avoid destroying the original property of the liquid crystal molecules when utilizing the liquid crystal alignment process of the present invention. The way to select UV spectrums, i.e. the selection of wavelengths or spectrums of UV1, UV2, and UV3, can be made according to Table 1. Different kinds of single-wavelength (or single-spectrum) rays can be selected and combined to fabricate a device capable of emitting rays of multiple wavelengths (or spectrums).

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A liquid crystal alignment process comprising steps of:
   providing a first substrate and a second substrate to form a liquid crystal accommodating space therebetween;
   pouring a liquid crystal composition into the liquid crystal accommodating space, the liquid crystal composition comprising liquid crystal molecules, a first monomer material, and a second monomer material, wherein the second monomer material is a non-polar monomer material having a lipophilic structure and the first monomer material is a polar monomer material having a hydrophilic structure;
   applying a voltage difference to the first and second substrates for arranging the liquid crystal molecules at a pre-tilt angle; and
   exposing the liquid crystal composition by mixed multi-spectrum rays including rays of at least two spectrums for polymerizing the first monomer material and the second monomer material to form two second polymer alignment layers on two opposite surfaces of the first and second substrates and two first polymer alignment layers on two opposite surfaces of the two second polymer alignment layers.

2. The liquid crystal alignment process according to claim 1, wherein in the exposing step, the first monomer material and the second monomer material are irradiated by the mixed multi-spectrum rays at the same time.

3. The liquid crystal alignment process according to claim 1, wherein the first monomer material and the second monomer material are exposed to be polymerized in one exposure procedure.

4. The liquid crystal alignment process according to claim 1, wherein in the exposing step, the mixed multi-spectrum rays comprise rays of which spectrum is within a range of absorption wavelengths of the first monomer material, or comprise rays of which spectrum is within a range of absorption wavelengths of the second monomer material.

5. The liquid crystal alignment process according to claim 1, wherein in the exposing step, the mixed multi-spectrum rays have at least two spectrums of which irradiation time spans are different to each other.

6. The liquid crystal alignment process according to claim 1, wherein the first monomer material is a polar monomer material having a short chain and the second monomer material is a non-polar monomer material having a long chain.

7. The liquid crystal alignment process according to claim 1, wherein the liquid crystal composition further comprises a polymerization initiator.

8. The liquid crystal alignment process according to claim 7, wherein in the exposing step, the mixed multi-spectrum rays comprise rays of which spectrum is within a range of absorption wavelengths of the polymerization initiator.

9. The liquid crystal alignment process according to claim 7, wherein in the exposing step, the mixed multi-spectrum rays comprise rays of which spectrum is within a range of absorption wavelengths of the first monomer material and rays of which spectrum is within a range of absorption wavelengths of the polymerization initiator, or comprise rays of which spectrum is within a range of absorption wavelengths of the second monomer material and rays of which spectrum is within a range of absorption wavelengths of the polymerization initiator.

10. The liquid crystal alignment process according to claim 1, wherein in the exposing step, the mixed multi-spectrum rays lie within an ultraviolet spectrum.

11. The liquid crystal alignment process according to claim 1, wherein the second monomer material has a long chain that has a polyimide group in one end and an interfering group in the other end, the first monomer material has a side chain, the side chain of the first monomer material joins the liquid crystal molecules and the interfering group of the second monomer material.

* * * * *